March 8, 1949.  H. CLEMENS  2,463,744
AIRPLANE DOLLY

Filed March 6, 1946  2 Sheets-Sheet 1

Harry Clemens
INVENTOR.

BY
ATTORNEYS.

March 8, 1949.  H. CLEMENS  2,463,744
AIRPLANE DOLLY
Filed March 6, 1946  2 Sheets-Sheet 2
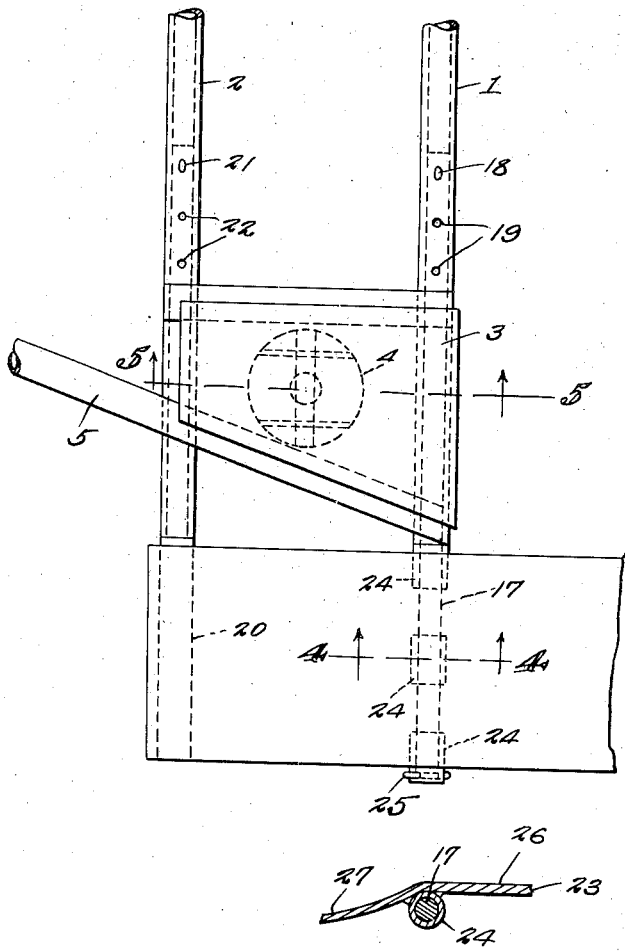
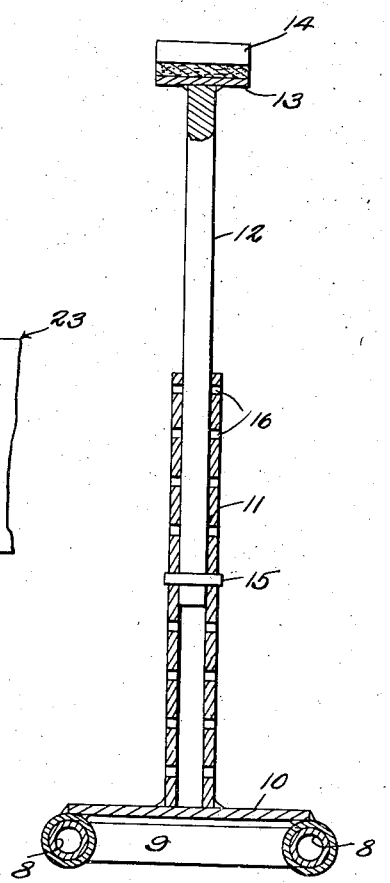
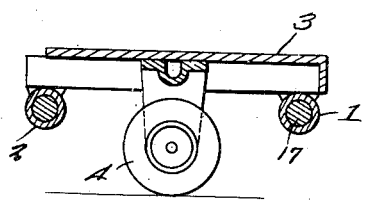
Harry Clemens
INVENTOR.
BY
ATTORNEYS.

Patented Mar. 8, 1949

2,463,744

UNITED STATES PATENT OFFICE 2,463,744

AIRPLANE DOLLY

Harry Clemens, La Porte, Ind.

Application March 6, 1946, Serial No. 652,279

9 Claims. (Cl. 280—35)

This invention relates to a dolly designed primarily for moving airplanes from place to place while they are grounded, it being especially adapted for use in hangars and other places where airplanes are to be stored in comparatively small spaces.

One of the objects of the invention is to provide a dolly onto which the wheels can be readily moved thereby transferring the weight of the airplane to the dolly, said dolly being equipped with a suitably positioned pedestal adapted to support the propeller shaft when the tail of the airplane is tipped upwardly, this positioning of the airplane on the dolly serving to distribute the weight of the supported structure in such a manner that it can be readily moved in any direction in order to bring the airplane into the desired position.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 3 is an enlarged top plan view of one corner portion of the dolly and part of a tiltable ramp associated therewith.

Figure 4 is a section on line 4—4 Figure 3.

Figure 5 is a section on line 5—5 Figure 3.

Figure 6 is an enlarged section on line 6—6 Figure 1.

Figures 1, 2:
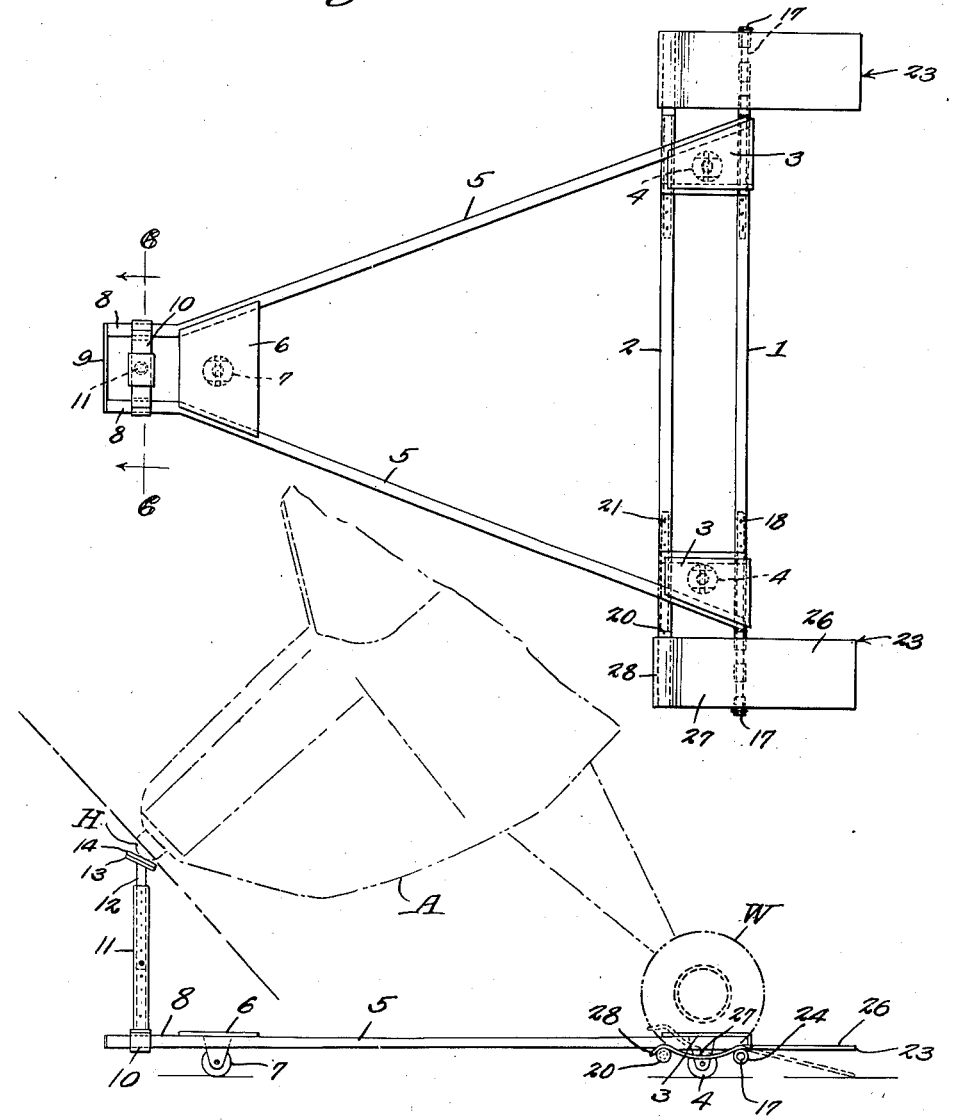
Figure 1 is a top plan view of the dolly.
Figure 2 is a side elevation thereof, a portion of a supported airplane being indicated by broken lines.

Referring to the figures by characters of reference, 1 and 2 designate parallel tubular members rigidly connected adjacent to their ends by top plates 3, each of which is mounted on and secured to a supporting wheel 4. Plates 3 and the end portions of the tubes 1 and 2 are also rigidly connected to forwardly converging side members 5 joined near their front ends by a connecting plate 6 supported by a wheel 7. These tubular members 1 and 2 and the side members 5 which can also be tubular, cooperate to define the rigid frame of the dolly which is substantially triangular. The forward ends of the side members 5 are extended forwardly, preferably along parallel lines, from the plate 6, as indicated at 8 and can be connected at their free ends by a cross strip 9. Slidably mounted on these end portions 8 which constitute parallel guides, is a cross head 10 on which a tubular post 11 is rigidly mounted. This post, which extends upwardly from the cross head, has a shank 12 adjustably mounted therein, said shank being provided with a head 13 at its upper end having a covering 14 in the form of a pad of soft rubber or the like. The shank 12 can be held adjustably to the tubular post 11 by means of a pin 15 insertable through the post and also through any one of a series of openings 16 extending through the post.

Seated in the end portions of the tubular cross member 1 are pivot rods or pintles 17 each of which can be adjustably held to the tubular member 1 by means of a locking pin 18 extending through any one of a series of openings 19 in the tubular member 1.

Adjustably mounted in each end of the tubular member 2 is an elongated stop pin 20, this pin being held in adjusted position by any suitable means such as a locking pin 21 insertable into any one of a series of openings 22 in the member 2.

Pintle 17 and stop pin 20 are parallel and each pintle 17 serves to support an elongated plate 23 which can be provided between its ends with bearing sleeves 24 rotatably mounted on the pintle. Withdrawal of these sleeves and the plate 23 from the pintle 17 can be prevented by the use of a cotter pin 25 or the like.

Each plate 23 has a flat portion extending backwardly from the pintle as indicated at 26 while that portion of the plate extending forwardly from the pintle is bowed downwardly, as indicated at 27, terminating at its free end in an offset portion 28 providing a seat for resting on the stop pin 20 when the plate is in one extreme position as shown by full lines in Figure 2.

Under normal conditions the flat portion of each plate 23 over balances the concave portion so that the back end of the plate 6 normally contacts the surface on which the dolly is mounted. Thus each of the plates 23 constitutes in effect a ramp up which the landing wheels W of an airplane A can be moved.

In practice, when it is desired to change the position of an airplane, the ramps formed by the plates 23 are adjusted towards or from each other until they are properly positioned to receive the two wheels of the airplane to be moved. This is done by adjusting the pintles 17 relative to the tubular frame members 1. The stop pins 20 should also be adjusted so as to be located properly across the ramps. Following this adjustment the dolly is backed against the wheels W so that the ramps 23 will become wedged between the wheels and the surface on which they are mounted. The airplane is then moved forwardly so that its wheels will travel up the inclined flat portions of the two ramps and over the pintles 17 whereupon they will become seated in the concave portions of the ramps and cause them to move downwardly on stop pins 28. Thus the wheels will be supported off of the ground. The airplane is thereafter tilted to lift the tail portion and bring the end of the propeller hub H against the soft seat provided by pad 14. It is to be understood, of course, that before tilting the airplane it is necessary to adjust this nose support to bring the pad to the proper elevation.

With the airplane thus arranged on the dolly is is a simple matter to move the dolly over a smooth supporting surface until the airplane has been brought approximately to the point where it is to be stored, whereupon by tilting it back to normal position and withdrawing the dolly from beneath the wheels W the airplane can be left at the said point.

It is to be understood that the dolly wheels 4 and 7 can be in the form of casters to facilitate movement of the dolly in any direction.

What is claimed is:

1. An airplane dolly including a movably supported frame, pintles adjustably connected to the frame and extending in opposite directions therefrom, stop elements extending laterally from the frame, and a ramp pivotally mounted on each pintle between its ends, each ramp including an end portion normally over balancing the opposite end portion and positioned in contact with a supporting surface, there being a recessed end portion of the ramp constituting a wheel receiving seat, said recessed portion being movable with the ramp into position between the pintle and the stop element while supporting the weight of an airplane wheel.

2. An airplane dolly including a movably supported frame, tiltable ramps pivotally mounted on the side portions of the frame at one end thereof, each of said ramps including a front seat portion and a rear portion, said portions being extended in opposite directions from the point of pivotal mounting of the ramp, the rear portion of each ramp constituting means for holding the seat portion normally elevated, means carried by the frame for limiting the downward movement of the seat portion, and an adjustable support on the other end of the frame positioned for engagement by the front end of a supported airplane when said airplane is tilted from normal position.

3. An airplane dolly including a movably supported frame, ramps tiltably mounted on the side portions of the frame at the rear end thereof, each of said ramps including a seat for a supported airplane wheel, each ramp being pivotally mounted between its ends, means for limiting the downward swinging movement of the seat portion of each ramp, and adjustable means adjustably mounted on the front portion of the frame for supporting the front end of an airplane when on the ramps and while tilted from normal position.

4. An airplane dolly including a movably supported frame, a pair of opposed wheel-receiving ramps tiltably mounted at one end of the frame, means for adjusting the ramps as to the distance therebetween, and an upstanding nose support mounted on the other end of the frame to slide along the longitudinal center line of the frame.

5. An airplane dolly including a movably supported frame, a pair of opposed wheel-receiving ramps tiltably mounted at one end of the frame, means for adjusting the ramps as to the distance therebetween, and an upstanding nose support mounted on the other end of the frame to slide along the longitudinal center line of the frame, said nose support comprising a supporting post, a shank slidable therein, and means for securing the shank and post against relative movement after slidable adjustment of the shank relative to the post.

6. An airplane dolly including a movably supported frame, a pair of opposed wheel-receiving ramps mounted at one end of the frame, means for adjusting the ramps as to the distance therebetween, parallel guide members rigidly connected to the other end of the frame and extended longitudinally of the frame, a cross head slidably on the guide members, an upstanding post rigid with the cross head, a nose-supporting shank slidable in the post, and means for securing the shank in positions to which it is slidably adjusted relative to the post.

7. An airplane dolly including a rigid, movably supported frame, pintles carried by and projecting laterally from the rear end thereof, ramps pivoted to the respective pintles and integrally formed with front wheel-receiving portions and rear runway portions normally overbalancing the front portions, means for limiting downward travel of the front portions, an upstanding nose support mounted on the front end of the frame, means for adjusting the support as to height, and means for adjusting the support as to its distance from the ramps.

8. An airplane dolly including a rigid wheel-supported frame, opposed pintles slidable in and projecting laterally from the sides of the frame at the rear end thereof, means for securing the pintles in positions to which slidably adjusted, opposed stop pins disposed adjacent and parallel to the pintles, said stop pins being slidable in and projecting laterally from the sides of the frame near the rear end thereof, ramps pivoted intermediate their ends to the pintles, each ramp being integrally formed with a flat rear runway portion and a depressed wheel-receiving front portion normally overbalanced by the rear portion, said stop pins comprising means for limiting downward travel of the front portions, a cross head mounted on the front end of the frame for sliding movement longitudinally of the frame, an upstanding post rigid with the cross head, a shank slidable in and projecting upwardly from the post, and means for securing the shank in positions to which it is slidably adjusted relative to the post, said shank adapted to support the nose portion of an airplane.

9. An airplane dolly comprising a wheel-supported frame of rigid construction and including parallel tubular members disposed transversely of the frame at the rear end thereof, forwardly converging side members, and parallel guide members disposed longitudinally of the frame at the front end thereof, opposed pintles slidable in and projecting from opposite ends of one of the tubular members, means for securing the pintles in positions to which slidably adjusted, stop pins slidable in and projecting from opposite ends of the other tubular member, means for securing the stop pins in positions to which slidably adjusted, airplane-wheel-receiving ramps pivoted medial of their ends to the respective pintles and each including a flat rear runway portion and a depressed front wheel-receiving portion, the rear portions normally overbalancing the front portions whereby the free ends of the rear portions will normally engage a supporting surface and the front portions will normally be elevated, said stop pins constituting means for limiting downward travel of the front portions, a cross head slidable on the guide members, an upstanding post rigid with the cross head, a shank slidable in and projecting upwardly from the post, means for securing the shank in positions to which slidably adjusted, and a pad on the outer end of the shank for supporting the nose portion of an airplane.

HARRY CLEMENS.

REFERENCES CITED

The following references are of record in the file of this patent:

UNITED STATES PATENTS

| Number | Name | Date |
| --- | --- | --- |
| 1,224,574 | Sessions | May 1, 1917 |
| 1,261,681 | Barnett | Apr. 2, 1918 |
| 1,637,789 | Schnitzer | Aug. 2, 1927 |
| 2,259,399 | Sutter | Oct. 14, 1941 |
| 2,277,787 | Scott | Mar. 31, 1942 |
| 2,414,383 | Merriam | Jan. 14, 1947 |

FOREIGN PATENTS

| Number | Country | Date |
| --- | --- | --- |
| 401,813 | Great Britain | Nov. 23, 1933 |
| 465,000 | France | Jan. 26, 1914 |